United States Patent [19]
Glaseman

[11] 3,735,647
[45] May 29, 1973

[54] SYNCLINAL GEARING

[76] Inventor: Vernon E. Glaseman, 3808 Kirkwood Road, Cleveland Heights, Ohio 44121

[22] Filed: July 1, 1971

[21] Appl. No.: 158,672

[52] U.S. Cl..............................74/715, 74/424.8 C
[51] Int. Cl..........F16h 1/42, F16h 1/18, F16h 57/00
[58] Field of Search................74/715, 410, 424.8 C

[56] References Cited

UNITED STATES PATENTS

| 2,631,475 | 3/1953 | Gleasman | 74/715 |
| 2,859,641 | 11/1958 | Gleasman | 74/715 |

FOREIGN PATENTS OR APPLICATIONS

| 768,330 | 8/1934 | France | 74/715 |
| 1,069,518 | 7/1954 | France | 74/715 |

*Primary Examiner*—Leonard H. Gerin
*Attorney*—Baldwin, Egan, Walling & Fetzer

[57] ABSTRACT

A gear arrangement, wherein a first pair of spur gears, concentric and rigidly connected for simultaneous rotation are in driving relation with a second pair of intermeshing gears similarly arranged, is rendered more effective in the smooth transfer of power by indexing the teeth of one of the concentric gears in at least one pair relative to the other of the concentric gears in the same pair by an amount between one-half of the circular pitch and full registration.

5 Claims, 5 Drawing Figures

PATENTED MAY 29 1973 3,735,647

INVENTOR
VERNON E. GLEASMAN

BY

Baldwin, Egan, Walling & Fetzer
ATTORNEYS

SYNCLINAL GEARING

An object of the present invention is to improve the efficient and smooth transfer of power wherein a pair of coacting gears are rigidly related to one another in a gear complex and in driving relationship with another pair of similarly related coacting gears on a second gear complex. This invention accomplishes this result by indexing one of the gears on a given gear complex with respect to the other gear rigidly related thereto in any relationship except full registration and half pitch indexing. This arrangement I have called "synclinal" because if, in a complex such as shown in FIG. 1, aligned diameters are drawn through two spur gears at one end of the complex whose teeth are in full mesh, and then the teeth of the two spur gears at the other end of the complex are formed so that their two teeth near longitudinal alignment with the first mentioned teeth have a tooth of one and a coacting tooth space of the other lying on diameters which are inclined toward each other downwardly, or upwardly, at equal angles relative to said aligned diameters so as to intersect, herein called synclinal, one arrives at the present invention.

The advantages of this invention will be more clearly understood from the accompanying specification and drawings and the essential features thereof will be set forth in the appended claims.

In the drawings,

FIG. 4 shows a differential gear mechanism adapted to utilize this invention; while

Figure 3:
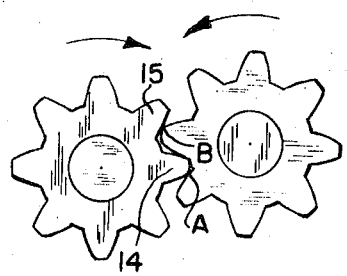
FIG. 3 is a somewhat diagrammatic showing of two meshing gears having a small number of teeth illustrating the problem of smooth transfer of power when a driving tooth is between full meshing positions.

The invention is herein described in connection with balancing gears 61 or 78 of a differential gear mechanism as shown in FIG. 3 of U.S. Pat. No. 2,859,641, granted Nov. 11, 1958 to Vernon E. Gleasman, and reproduced here in FIG. 4. This invention could also be applied to balancing gears in any similar differential mechanism, or to any gearing requiring smooth transfer of power between two pairs of gears having a small number of teeth, say twenty or less.

Figure 1:
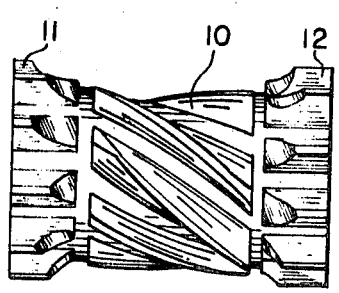
FIG. 1 is a side elevational view of a gear complex embodying this invention.

FIG. 1 discloses a gear complex comprising a worm wheel 10, corresponding to 60 in the above mentioned patent, combined in a unitary structure with a balancing gear 11 at one end of the worm wheel and a balancing gear 12 at the opposite end thereof, corresponding to gears 61 in the above mentioned patent. A through opening extends axially of the complex as indicated at 13 in FIG. 2 and in use of this invention, a shaft, such as 62, FIG. 4, extends through this opening and is received in a differential casing. In this use of the invention, two identical mechanisms are provided, each one comprising three of the complexes shown in FIG. 1 arranged so that each worm wheel 10 meshes with a central worm or traction gear which is keyed to one of the stub shafts leading to a drive wheel of an automotive vehicle, and then two of these mechanisms are secured together in a differential gear mechanism with the balancing gears 11 and 12 of each complex in one half of the differential meshing with a like balancing gear in the other half of the gear mechanism.

It is well known in gear construction that when one tooth of a spur gear is in full registration with the space between two teeth on a coacting spur gear, there is a backlash resulting from the tooth fitting loosely in the coacting recess of the cooperating gear. As the mating teeth pass through this position, there is a failure of power transmission while the tooth takes up the backlash in the coacting gear recess. This problem is of no great amount in gears having a large number of teeth, where plural teeth are simultaneously in mesh, but becomes increasingly important as smaller gears are encountered. In such cases the interengaged teeth almost reach a position of no power transfer as illustrated in FIG. 3. Here driving tooth 14 is about to wipe out at A and tooth 15 is exerting almost a radial thrust at B on the driven gear. Therefore, this invention is particularly valuable when utilizing balancing gears having twenty teeth or less.

Figure 2:
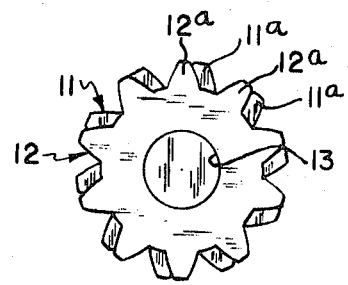
FIG. 2 is an end elevational view of the gear complex of FIG. 1.

Referring now to FIG. 2 which is an end elevational view taken from the right-hand end of FIG. 1, it will be noted that the teeth 11a on the gear 11 are indexed clockwise relative to the teeth 12a of the gear 12 by an amount greater than a normal manufacturing tolerance, and here shown, merely for illustration, equal to about one-quarter of the circular pitch. By this arrangement, when the teeth of gear 11 are passing through the position of full registration in a tooth space of a coacting gear, then the teeth of gear 12 will be in firm driving engagement with the coacting tooth spaces of a mating gear, as in FIG. 4. Thus, at no time, are the teeth of gears 11 and 12 at the same time in full registration at the same moment. It should be obvious to those skilled in this art that the occurrence of simultaneous backlash positions occurs either when the teeth of gears 11 and 12 are in full longitudinal registration or at the position of half-pitch indexing. It is recognized that there is such a thing as a normal manufacturing tolerance, generally not greater than 0.005 inches with respect to alignment of the teeth positioned as those of gears 11 and 12 at opposite ends of a complex even when one is striving for complete longitudinal alignment. It should be understood that this invention calls for a greater relative indexing between the teeth of gears 11 and 12 than that encountered in normal manufacturing tolerances, in other words, any synclinal position between longitudinal registration and half-pitch indexing.

Figure 4:
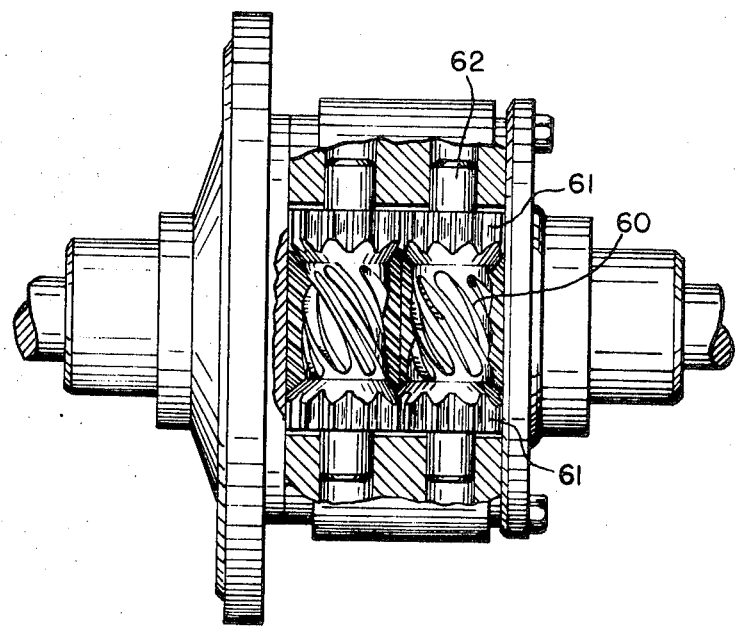

FIG. 4 of the present drawings is identical with FIG. 3 of Gleasman Pat. No. 2,859,641 to which reference may be had, if necessary, for a more complete understanding of the intermeshing of the balancing gears of a complex like FIG. 1 with the coacting balancing gears of the other half of the differential mechanism.

Figure 5:
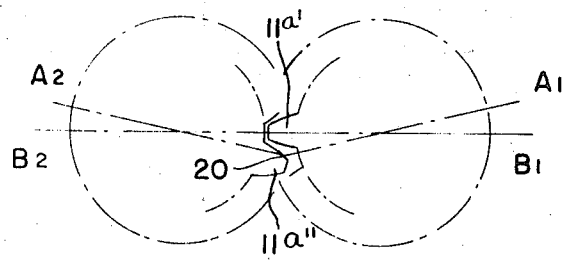
FIG. 5 is a diagram showing the relative position of spur gears when two of the complexes of FIG. 1 are in mesh as in FIG. 4.

FIG. 5 is a diagrammatic view of two of the complexes like FIG. 1 meshing together in driving relationship as shown in FIG. 4. At the right-hand side of FIG. 5 is shown the addendum circle for the teeth 11a' at the far end of one of the complexes, while the dot-dash circle at the left-hand side is the addendum circle for the teeth 11a'' of a coacting spur gear. The teeth at the ends of the complexes nearer the viewer in FIG. 5 would be 12a' on the right-hand complex and 12a'' on the left-hand complex but these are not shown so as not to confuse the drawings. However, the fully meshing tooth 11a' on the right-hand complex and the coacting tooth space on the left-hand complex are centered on the aligned diameters B1 and B2. According to this invention, the tooth 12a' nearest longitudinal alignment with the tooth 11a' would be centered on the inclined diameter A1. The coacting tooth space on the left-hand complex nearest the viewer would be centered on the diameter A2. Note that the diameters A1 and A2 are inclined toward each other downwardly at equal angles relative to the aligned diameters B1 and B2 at the opposite end of the complex so as to intersect at a point 20 equally spaced from the two addendum circles. This arrangement I have called herein synclinal. It will be understood that the diameters A1 and A2 might be inclined upwardly relative to the diameters B1 and B2 because such a change makes no difference in the practice of the present invention.

What is claimed is:

1. A gear complex arrangement for efficient and smooth transfer of power to a coacting meshing gear complex arrangement, comprising a pair of spur gears on one complex mutually intermeshing respectively with a pair of spur gears on the other complex, said gears of each complex mounted concentric and in longitudinally spaced relation on a common shaft and both rotatable therewith, and with the teeth of intermeshing gears at one end of said complexes in a synclinal relationship with the teeth at the other end of said complexes nearest longitudinal alignment with said first named teeth, such that the teeth of one gear of said pair on the same complex are indexed relative to the teeth of the other gear of said pair nearest longitudinal alignment by an amount greater than a normal manufacturing tolerance and avoiding a relative position at one-half of the circular pitch and one in full registration, whereby the teeth of only one of said pair of gears is in full mesh with its coacting gear at any given time.

2. A gear arrangement as defined in claim 1, wherein said two spur gears of said pair have the same number of teeth.

3. A gear arrangement as defined in claim 1, wherein said indexing of the teeth of said one of said pair of gears relative to the teeth of the said other of said pair of gears is greater than five-thousandths of an inch.

4. A gear arrangement as defined in claim 1, wherein said gears of said pair have less than 20 teeth each.

5. A gear arrangement as defined in claim 1, wherein said indexing of the teeth of said one of said pair of gears relative to the teeth of the said other of said pair of gears is about one-fourth of the circular pitch.

* * * * *